United States Patent [19]
Morales

[11] Patent Number: 5,872,589
[45] Date of Patent: Feb. 16, 1999

[54] INTERACTIVE TV SYSTEM FOR MASS MEDIA DISTRIBUTION

[75] Inventor: Fernando Morales, Reston, Va.

[73] Assignee: Interactive Return Service, Inc., Reston, Va.

[21] Appl. No.: 214,414

[22] Filed: Mar. 18, 1994

[51] Int. Cl.$^6$ ........................................ H04N 7/00
[52] U.S. Cl. ............................ 348/13; 348/2; 348/473
[58] Field of Search .................... 348/1–7, 12, 13, 348/460, 484, 485, 486, 473; 455/2, 3.2, 4.2, 5.1; 358/142, 146, 147, 86; H04N 7/00

[56] References Cited

U.S. PATENT DOCUMENTS

| | | |
|---|---|---|
| 4,230,990 | 10/1980 | Lert, Jr. et al. . |
| 4,591,906 | 5/1986 | Morales-Garza et al. . |
| 4,755,871 | 7/1988 | Morales-Garza et al. . |
| 5,036,389 | 7/1991 | Morales . |
| 5,101,267 | 3/1992 | Morales-Garza . |
| 5,213,337 | 5/1993 | Sherman ..................................... 455/2 |
| 5,223,923 | 6/1993 | Morales-Garza . |
| 5,257,099 | 10/1993 | Morales-Garza . |
| 5,291,554 | 3/1994 | Morales . |
| 5,388,101 | 2/1995 | Dinkin ...................................... 348/13 |
| 5,438,355 | 8/1995 | Palmer ...................................... 348/13 |
| 5,721,584 | 2/1998 | Yoshinobu et al. ........................ 348/13 |

FOREIGN PATENT DOCUMENTS

| | | |
|---|---|---|
| 0535572 | 4/1993 | European Pat. Off. . |
| 52-0036907 | 3/1977 | Japan ........................................ 358/86 |
| 60-0032448 | 2/1985 | Japan ....................................... 455/6.3 |
| 0058132 | 3/1989 | Japan .............................. H04N 7/15 |
| 0217307 | 8/1994 | Japan .............................. G04N 7/173 |

Primary Examiner—David E. Harvey
Attorney, Agent, or Firm—Roberts & Brownell, LLC

[57] ABSTRACT

A TV viewer is presented various offers for products and services displayed on his TV screen. Pre-obtained unique product and service codes are generated by the TV program during the offers. The viewer has a remote control device for indicating his acceptance of an offer. An audio beep corresponding to the unique code is transmitted by the program along with the offer. This beep is picked up by a microphone and is transmitted, along with the remote control acceptance indication, by a transmitter located at the viewer's location to a nearby repeater station. The transmitted signal is data including an identification of the viewer's location as well as the accepted offer code. This data is relayed to a nearby repeater station and then to a central data collection station where the acceptance is processed. A universal IR remote control device is employed that can communicate a viewer's selections from TV offer's, or can alternately read bar codes from printed media offers at the viewer's location for transmission through the system to the central data collection station.

6 Claims, 10 Drawing Sheets

INTERACTIVE TV SYSTEM FOR MASS MEDIA DISTRIBUTION

FIELD OF THE INVENTION

The present invention relates to interactive data systems, and more particularly to a one-way communication system for communicating TV audience requests with a central processing location via intermediate repeater stations.

BACKGROUND OF THE INVENTION

The prior art includes many systems for achieving interactive communication between a central station and geographically disbursed TV users. For example, in my previous patent U.S. Pat. No. 5,257,099, issued Oct. 26, 1993, a typical satellite communication system employing intermediate repeater stations is disclosed.

In my earlier system, a network of local audience response systems, where TV watchers are located, is coupled together with a central audience response processing station via a satellite communication link. The system required the embedding of questions, destined for the TV audience, in the TV picture program transmission. This real time system required that each local area repeater station and each end user response unit be identified and verified by allocation of specific time slots for responses from a TV watcher synchronized to a TV picture program transmission carrying the audience questions to be answered. Response units in the audience generate answers in the form of "beep" signals that are communicated back to a central station, via a repeater station, and the answer is synchronized with the question destined for a particular response unit so that positive identification of the particular response unit may be made in real time.

Several significant shortcomings existed in my prior patents. For example, the central station usually required a studio for generating a TV program with questions that were embedded in the video signal during specific time slots of the synchronization interval of each horizontal line in the video signal, which also contained the normal TV program.

In utilizing my previous system, a TV viewer would watch a program transmitted from the central station and when prompted to answer a question, the viewer would do so with an infrared remote device. His response is synchronized with the transmission of the question to his particular TV so that the central station could identify the answer from a particular response unit. This previous system is quite limiting in that the viewer can only interact with the system for a particular transmitted TV program, in real time. The prior system is also quite expensive in that it incorporates two-way communication over an independent channel from a central location to local area repeaters and then to viewers at response units.

BRIEF DESCRIPTION OF THE PRESENT INVENTION

The present invention does not use bidirectional interactive communication. Although the present system utilizes a central processing station, repeaters, and response units at viewer locations, the system does not broadcast TV programs, nor does it broadcast questions for viewers. TV programs and questions are generated from normal TV program sources (broadcast and cable). As in the case of my prior patents, the questions may relate to surveys, or be offers for the sale of goods and services. These sources obtain unique questions, product and service codes in advance, from the system operators. During a normal TV program, an advertiser may offer a particular product or service for sale and during the offer, an audio tone is generated which corresponds to the unique code previously obtained. In the event a viewer, provided with a remote-control device at a response unit, actuates the remote control device so as to accept the offer, this event, along with the audio signal corresponding to the unique code, are transmitted through a wireless link to a local area repeater station which verifies the order and relays it to a central audience response data center for further processing.

The entire procedure for the present system is accomplished quickly, but not in real time, thereby avoiding a great many of the limitations of earlier interactive systems. Further, means are provided in the present system for repeating a viewer's order redundantly so as to increase the likelihood that the wireless transmission of the order will be successfully picked up by a local area repeater station.

Since the present system provides for the obtaining of unique beep codes for advertised products and services, these codes may be incorporated in normal radio programming as well as in VCR use. A still further exciting extension of the present system is the utilization of unique codes, in bar code format, appearing in the printed media such as newspapers, magazines, catalogs, etc. The present system envisions a bar code scanner, located at the response units, which can scan the codes on the printed matter and transmit them as corresponding beeps over the same wireless link to a local area repeater station. Accordingly, the present system can generate answers to questions or requests for products and services offered from different electronic and printed media over a national wireless return path. The present system is most amenable to maximizing use of a 500 kilohertz channel allocated by the FCC for IVDS communication in a more efficient way than accomplished by the prior art, since the present system uses the bandwidth only for answers to questions and requests for products and services from users.

Other objects, features and advantages of the present invention will be found in the following description, drawings and claims.

BRIEF DESCRIPTION OF THE DRAWINGS

The above-mentioned objects and advantages of the present invention will be more clearly understood when considered in conjunction with the accompanying drawings, in which.

DETAILED DESCRIPTION OF THE INVENTION

Figure 1:
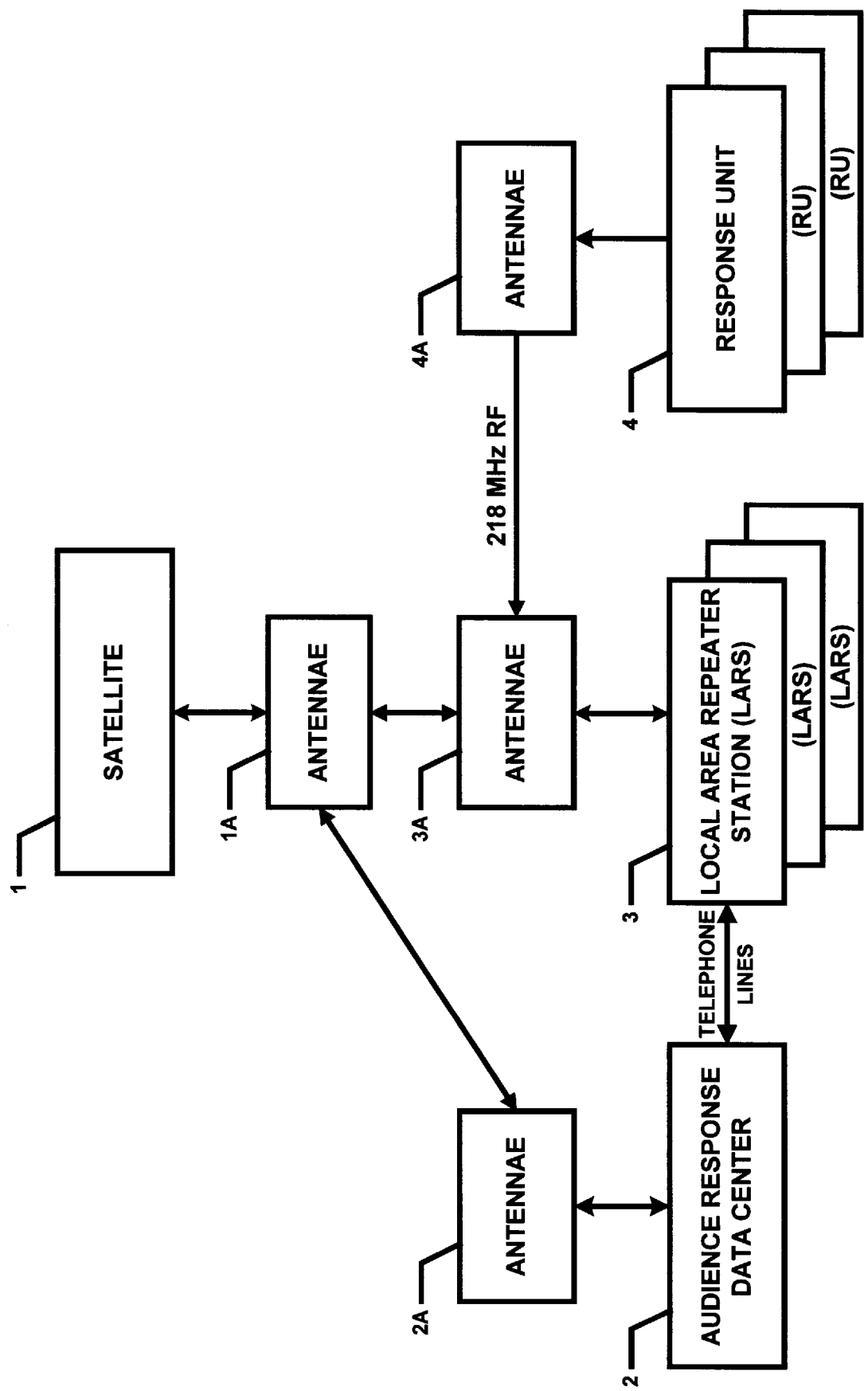
FIG. 1 is a block diagram of a satellite communication interactive system in accordance with the present invention.

FIG. 1 illustrates a generalized system in accordance with the present invention. A conventional communication satellite 1 has an antenna 1A which establishes bidirectional links with a central audience response data center 2 provided with its own antenna 2A. Ground based local area repeater stations 3 are provided with respective antennas 3A for communicating with the satellite 1. As will be appreciated, the satellite 1 enables long distance relaying of bidirectional communication between the audience response data center 2 and a host of local area repeater stations 3. Where appropriate, the bidirectional communication between data center and repeater stations may be obtained through telephone lines as indicated. End users are located at response unit sites 4 and each local area repeater station services a number of response units 4.

By way of example, if a TV viewer is located at a response unit site 4, he may receive normal TV transmission, cable or even utilize VCR media in a conventional fashion. Unlike my prior systems, none of the programming material is created or transmitted by the system itself.

The present system serves as a unidirectional wireless return path for responses made by the end user at a response unit site. More particularly, the responses, as will be explained hereinafter, are relayed to the audience response data center 2 for processing, via an involved repeater station 3 and satellite 1. Thus, by way of example, if a normal TV program offers a product or service, the viewer is given the opportunity to accept the offer. As will be explained hereinafter, the viewer wishing to do so returns a unique code, corresponding to the particular product or service accepted, and this code is returned to a local area repeater station 3 for relaying back to the audience response data center. Along with the relayed product or service code is an identification of the particular response unit involved. As will be elaborated upon herein, the same type of wireless data return is possible for products or services accepted from printed media (e.g. newspapers, catalogs) at the site of a response unit 4.

As will be seen in FIG. 1, the response unit 4 is provided with an antenna which transmits response unit identification as well as the unique code over a unidirectional RF link (e.g. 218 MHz) to a receiving antenna located at at least one adjacent local area repeater station 3.

Typically, the present system may be used for a wide spectrum of applications including: national or international audience polling, weather condition polling, price or market surveys and other financial data processing of product or service orders, educational purposes such as grading examinations from a network of classrooms, and billing and accounting for receipt of special cable TV programs.

Figure 2:
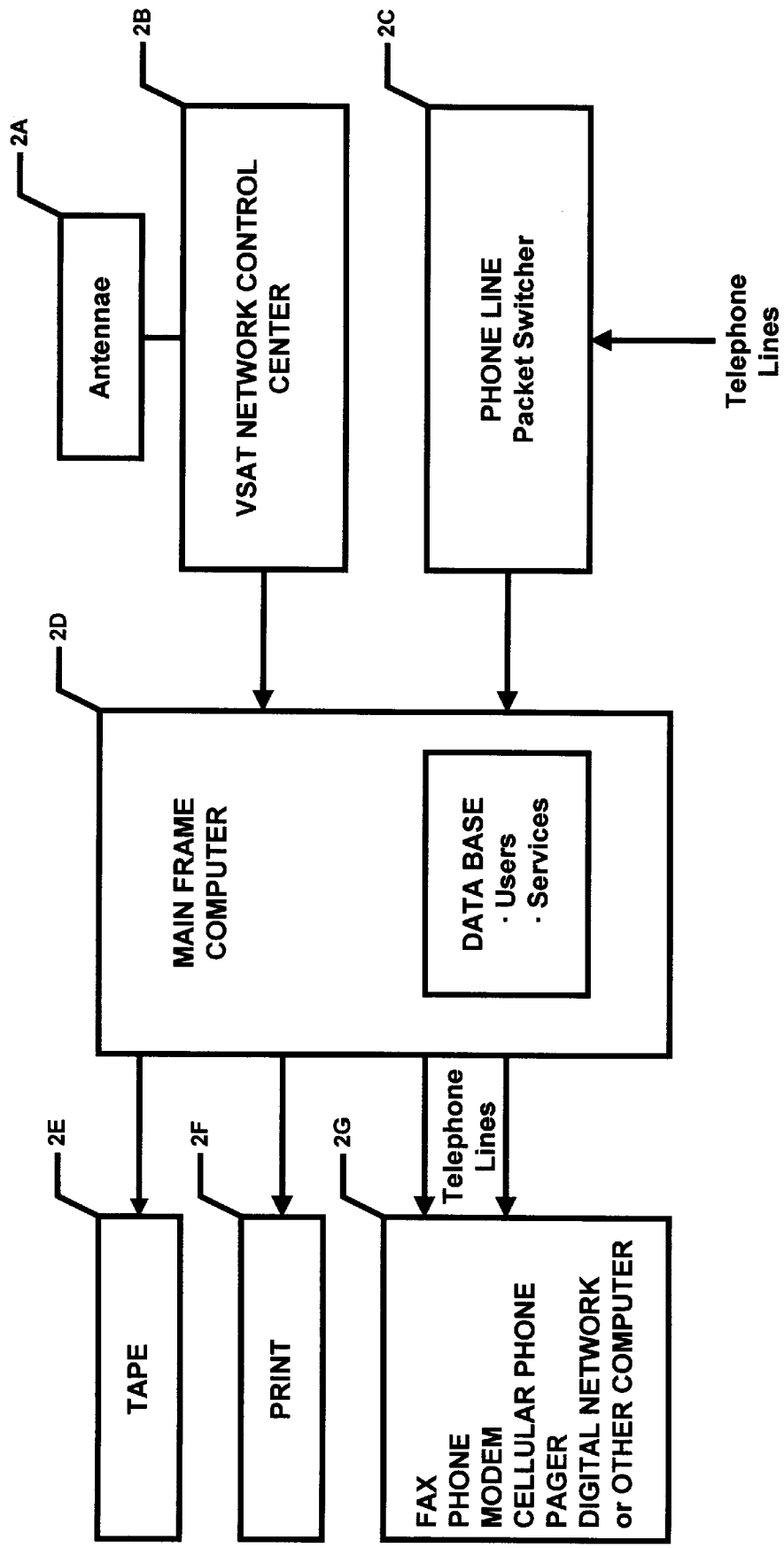
FIG. 2 is a block diagram of a data processing center for receiving audience responses from a plurality of remote locations.

FIG. 2 illustrates in greater detail a block diagram layout of the response data center 2. The data center directional parabolic antenna 2A receives response data from the response units 4 via corresponding repeater stations 3. In a preferred embodiment of the invention, communication between the data center, repeater stations and the satellite utilizes very small aperture terminal technology (VSAT). Signal control is achieved through a conventional network control center 2B with a mainframe computer 2D which has loaded therein, a database of users and goods and services being offered by unique code when particular goods and services are advertised to the end user at the response unit 4. In lieu of satellite communication, telephone communication may be employed between the repeater stations 3 and the data center 2, where appropriate. Telephone data would be provided to a conventional packet switcher 2C prior to being input into computer 2D. Records of response transactions may be made with conventional media such as a tape 2E or printout 2F. Telephone lines between the data center and external system points may also serve as a means for other forms of telecommunications therebetween as indicated by 2G.

Normally, responses from response units 4 undergo initial verification at the local repeater stations 3. Thereafter, the responses are centrally received at the data center 2 for further verification and processing. In the case of orders being received from response units, these may be processed for advertisers and sent to them through the various telecommunications media indicated by 2G.

Figure 3:
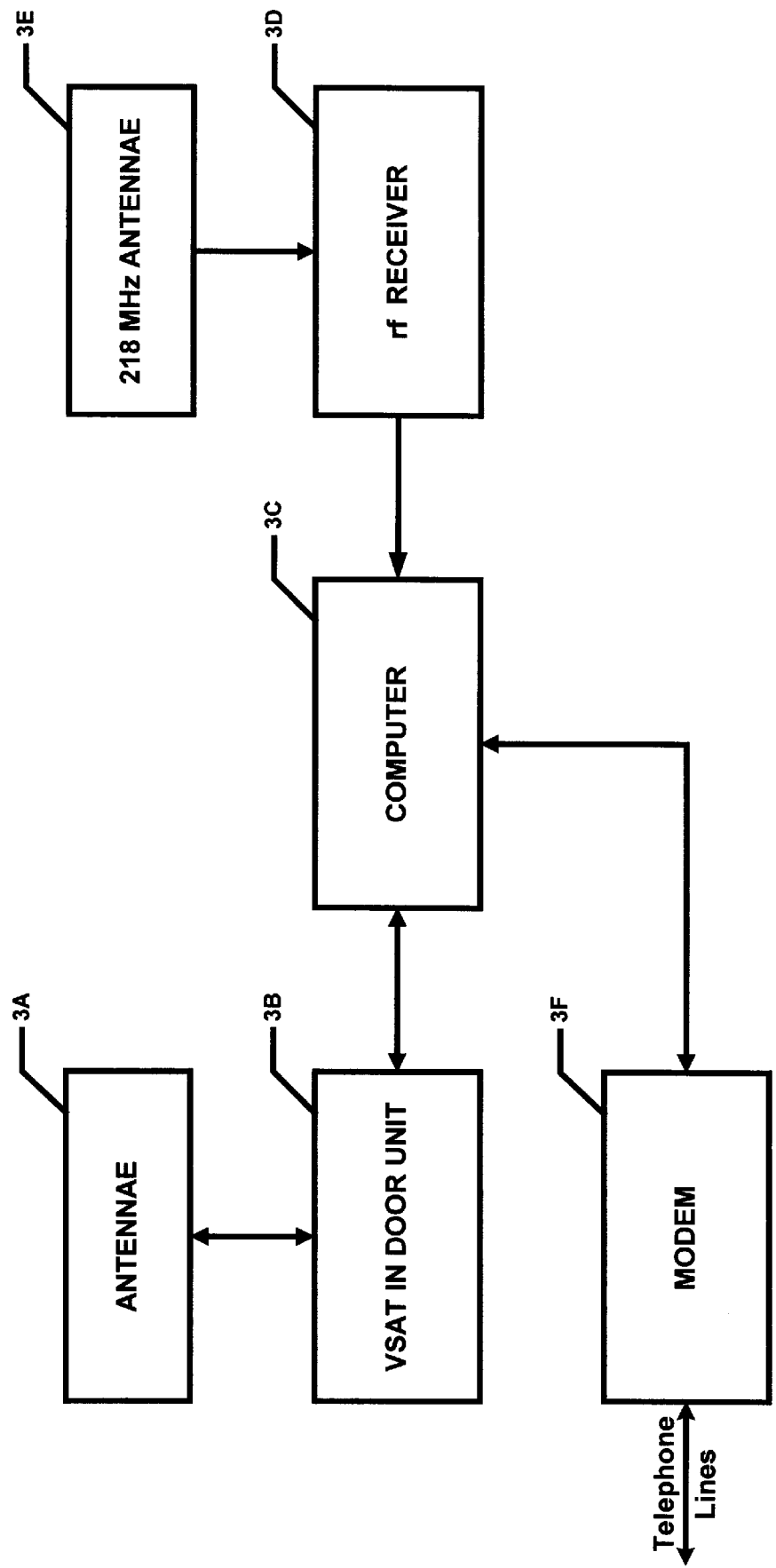
FIG. 3 is a block diagram of a local area repeater station.

Typical local area repeater equipment is schematically shown in FIG. 3. The antenna 3E permits reception of answers, from response units, in receiver 3D for verification and processing by a computer 3C at the repeater station site. A VSAT indoor unit 3B and antenna 3A of conventional design may communicate with the satellite data processing link or alternatively, through phone lines by means of modem 3F. As previously mentioned, computer 3C may be programmed to verify received responses from response units. As is customary, satellite VSAT equipment distinguishes between the transmissions from various local repeater stations to prevent interference or to permit simultaneous transmission on separate frequency bands.

Figure 4:
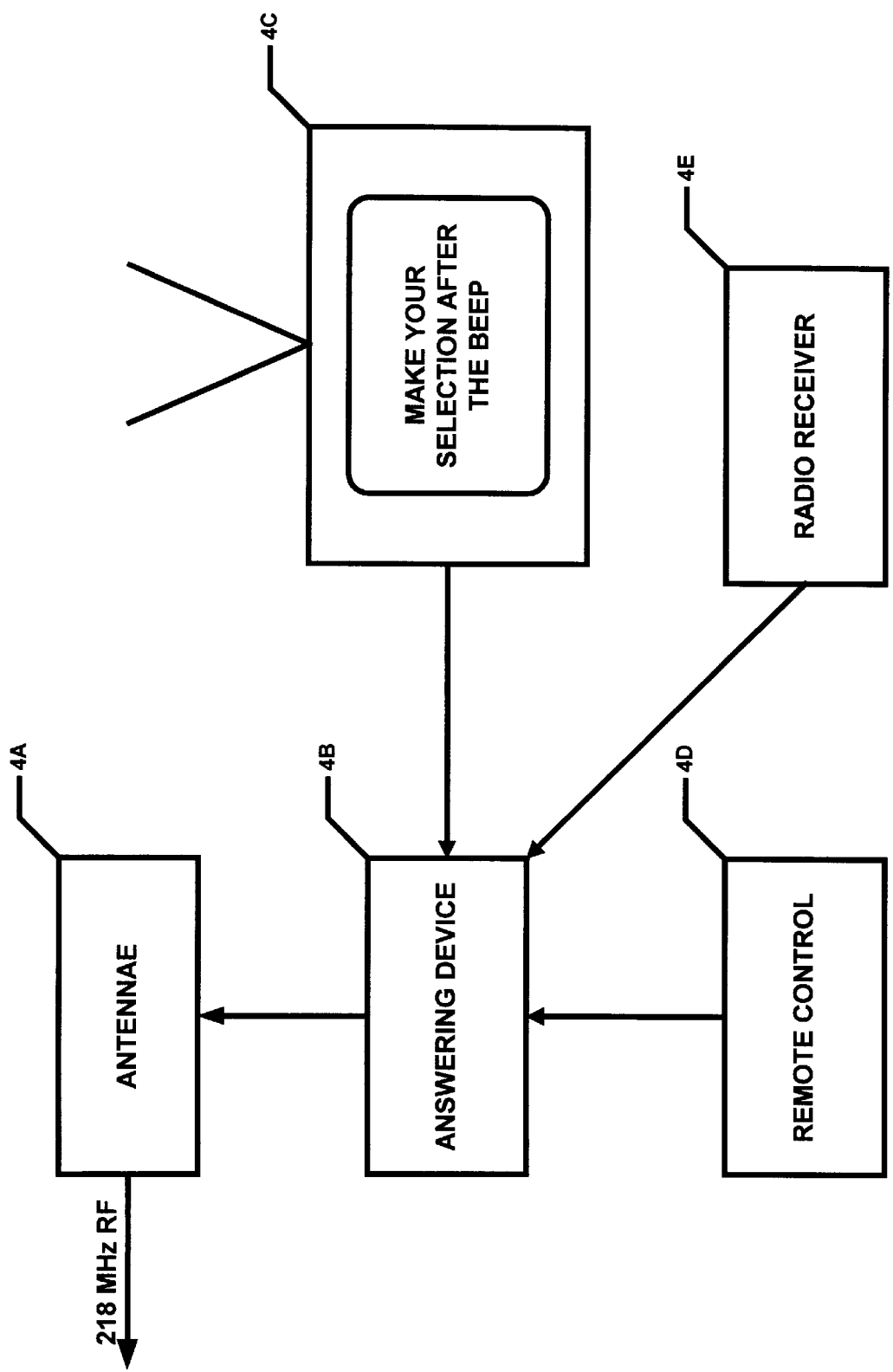
FIG. 4 is a block diagram of a response unit wherein an end user may be watching television or listening to radio.

A simplified response unit is shown in FIG. 4 wherein an infrared remote control unit 4D provides selectable responses by a user, which are transmitted to answering device 4B. Although infrared is mentioned, other conventional forms of wire or wireless transmission may be employed.

In operation of the simplified system shown in FIG. 4, a TV broadcast from a party independent of the system conducts a survey or makes an offer to a television viewer as indicated by 4C. Along with the oral or visual offer is a beep that represents a product or service code which has been previously obtained from operators of the system. A microphone (not shown in FIG. 4) picks up the beep and conveys the code to the answering device so as gate through the viewers response entered on the remote-control device 4D. The result will be the transmission of a radio signal, from antenna 4A to a nearby repeater station. The transmitted data to the repeater station will include such data as response unit identification as well as an identification of the code for the accepted product or service entered on the remote control unit 4D. A similar scenario can pertain to offers made on a radio 4E as opposed to a television 4C. Responses by users can be associated with surveys as well as product/service orders.

Figure 5:
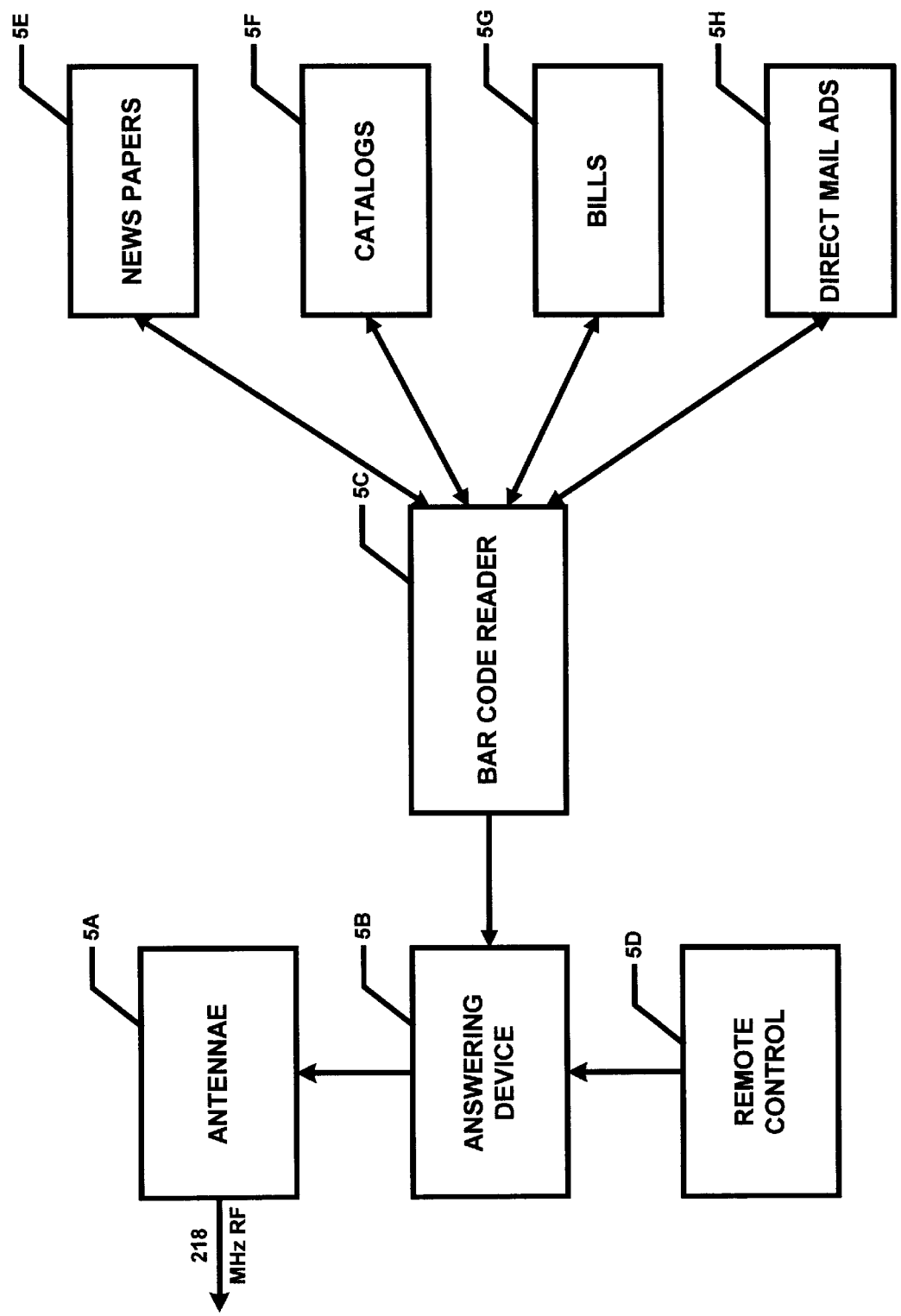
FIG. 5 is a block diagram of a response unit used in conjunction with printed media.

The present invention further envisions the capability, at a response unit, for inputting desired product or service codes into the system which originate in printed media as opposed to on radio or TV (FIG. 5). Thus, certain pre-obtained codes may appear in newspapers 5E, catalogs 5F, bills 5G and direct mail ads 5H as examples. The codes would be bar codes and a bar code reader 5C can be provided at each response unit. The output from a bar code reader provides the product or service code information to the answering device 5B and actuation of the remote control device 5D provides the complimentary data required for response unit identification. Of course, the units indicated by 5A–5D can be packaged as a single unit.

Figure 6:
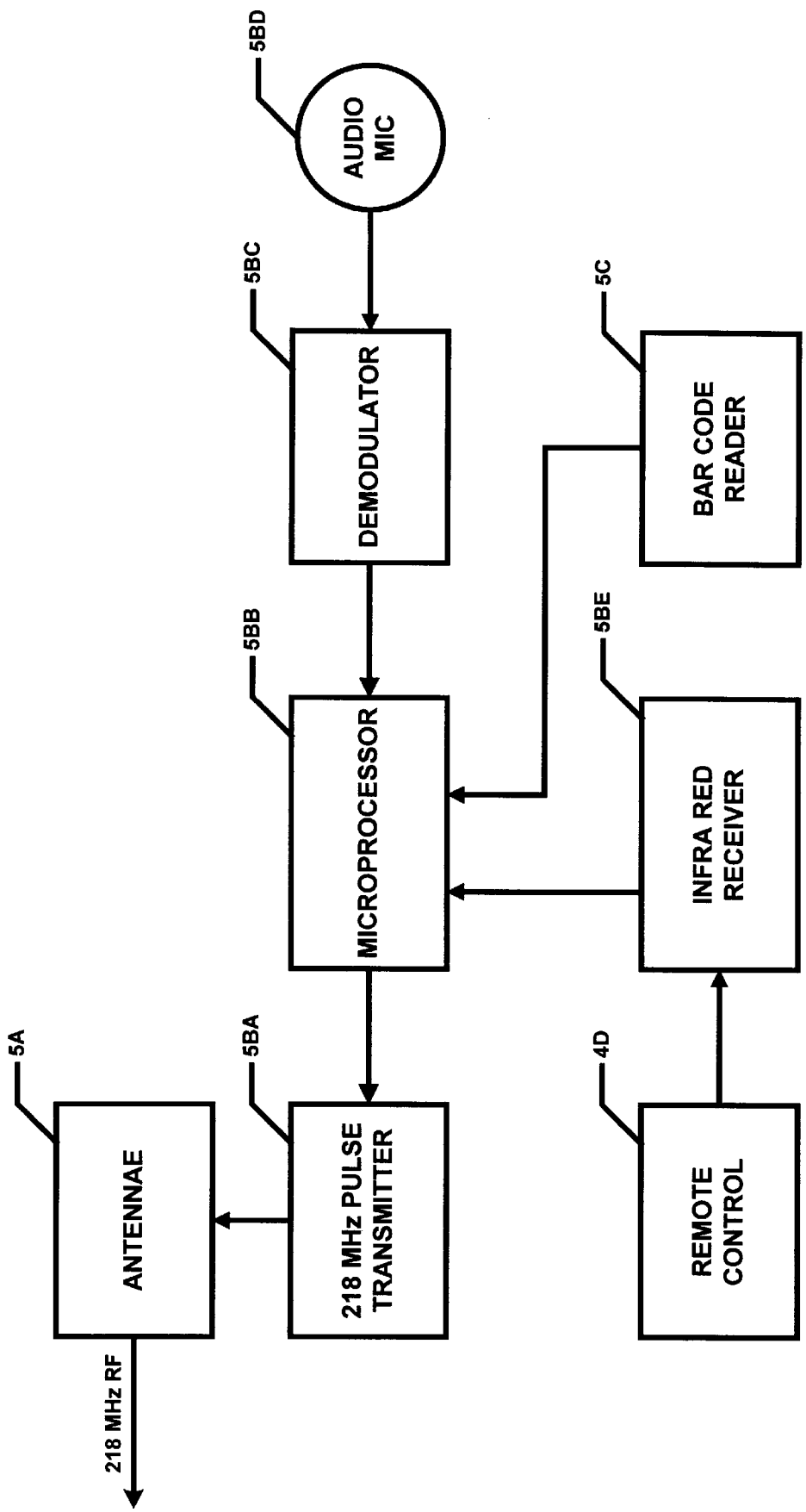
FIG. 6 is a block diagram of an answering device utilized in a response unit.

The answering device is shown in greater detail in FIG. 6. As previously mentioned in connection with FIG. 4, an audio beep is generated during a TV or radio program. It is picked up by a microphone 5BD. A microphone is placed in proximity to either the TV or radio and generates an output to a conventional demodulator 5BC. In the event a bar code reader 5C is used in a printed media mode as explained in connection with FIG. 5, the output of the bar code reader is input to microprocessor 5BB which also receives signals from the demodulator 5BC and detects the code which will for the basis of an answer to be relayed via the repeater, to the response data center 2 (FIG. 1). The remote control unit 4D provides a second and necessary input to the microprocessor 5BB, via an infrared receiver 5BE. Of course, as previously mentioned, other wireless or cable control devices may be used in lieu of infrared.

The identification of the response unit making the selection may be stored in the microprocessor. Assembled response unit identification and answers are input to a pulse transmitter 5BA which in turn is connected to antenna 5A. The resulting data is thus transmitted to the repeater station.

Figure 7:
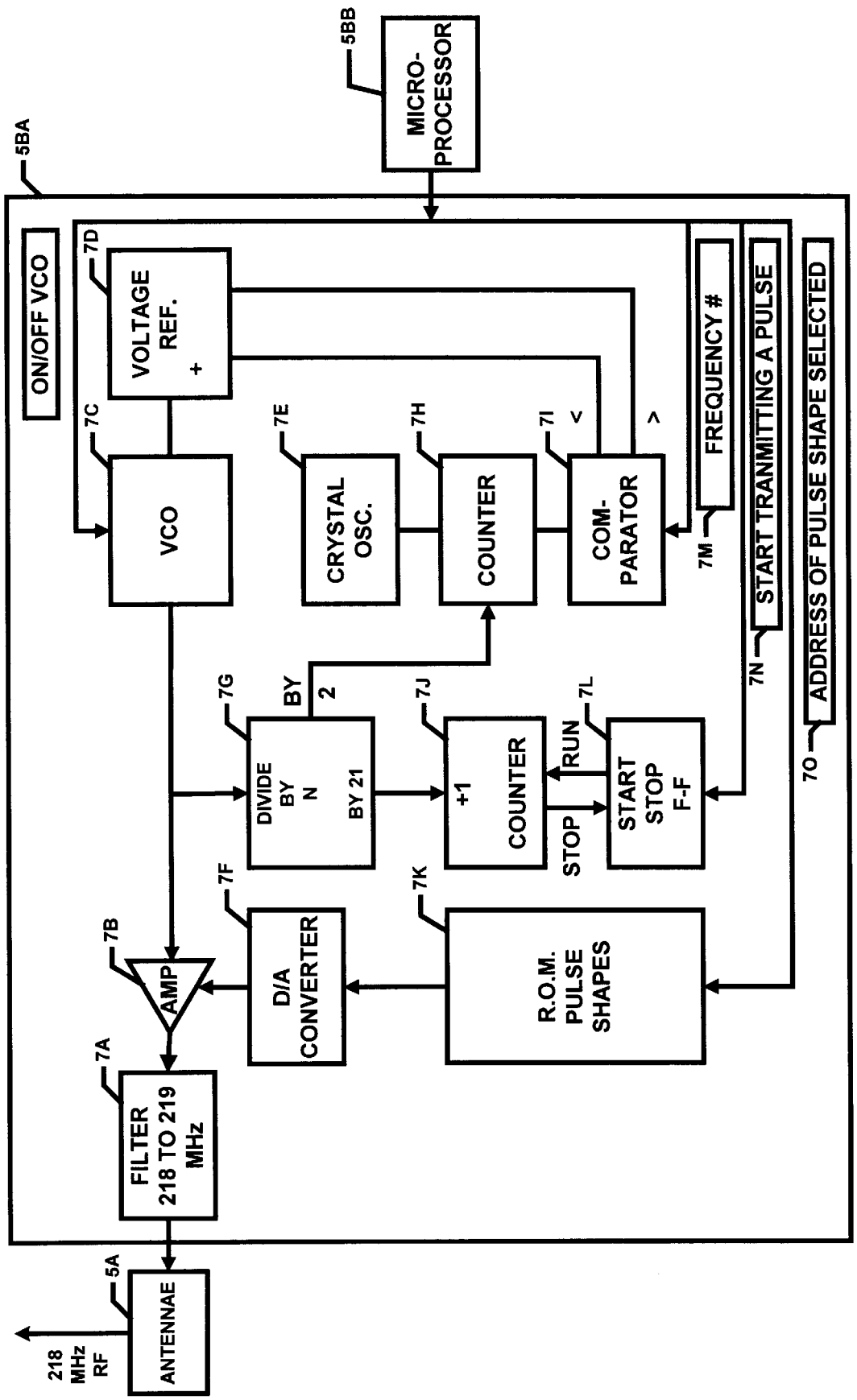
FIG. 7 is a block diagram of a frequency synthesizer incorporated in a pulse transmitter of the answering device shown in FIG. 6.

FIG. 7 shows in greater detail the details of pulse transmitter 5BA of FIG. 6. The following discussion will explain how the microprocessor 5BB (FIG. 6) can randomly select frequency and spread spectrum pattern. In FIG. 7, the ROM 7K contains a set of different numbers that can be selected by the microprocessor 5BB on an arbitrary basis. These numbers are converted in the D/A converter 7F when the counter 7J begins counting. The end result at the output at the D/A converter is an arbitrarily selected pulse shape from a corresponding set of different possible pulse shapes stored in the ROM 7K. The microprocessor also provides on/off control signals to a conventional voltage controlled oscillator 7C having a voltage reference 7D connected thereto. The output from the VCO 7C is a precise frequency (e.g. 218 MHz). This basically constitutes a carrier frequency which is modulated by changing pulse shapes provided by the ROM 7K, D/A converter 7F, and amplifier 7B. The output from the amplifier is filtered at 7A and the resulting data including answers, orders, and identification, will be transmitted from antenna 5A to a nearby repeater station.

In order to ensure a precise stable frequency from VCO 7C a comparator circuit is provided. Specifically, comparator 7I receives a number from microprocessor 5BB that represents a frequency at which the VCO 7C is to oscillate. A crystal oscillator 7E is connected to a first input of counter 7H. A feedback loop is provided by the divide by N circuit 7G which divides the output frequency of the VCO 7C by a preselected number. The divided frequency value is counted by counter 7H in a stable manner due to the existence of the crystal oscillator 7E. An error signal is created by the comparator, from a comparison of the output of counter 7H and the frequency number input from the microprocessor 5BB. This error signal serves as an input to the voltage reference 7D for regulation.

The circuitry of FIG. 7 can synthesize a frequency randomly selected by the microprocessor 5BB. After the microprocessor turns on VCO 7G, the frequency from the output of the VCO 7C becomes stable. The start/stop flip flop 7L is set by a first trigger input coming from the microprocessor 5BB along a control line which signals the start of a transmission pulse. Counter 7J is connected between an output of the divide by N circuit 7G and flip flop 7L. When stable operation occurs, the flip flop 7L triggers the counter 7J, and the indicated output from counter 7J to ROM 7K gates the address of a randomly selected pulse shape from the microprocessor 5BB. Each transmission from the synthesizer for a particular answer or product/service acceptance occurs several times and with different pulse envelopes or "signatures" to increase reliability. By randomly transmitting the data from response units to a repeater, the local repeater station is not barraged by requests and answers simultaneously entered by individuals watching or hearing the same program offers or questions.

This affords the present system a great advantage over previous systems, namely the ability of the system to process more answers or requests with a greater likelihood of successful transmission through the return path including the repeater station and data center.

Figure 8:
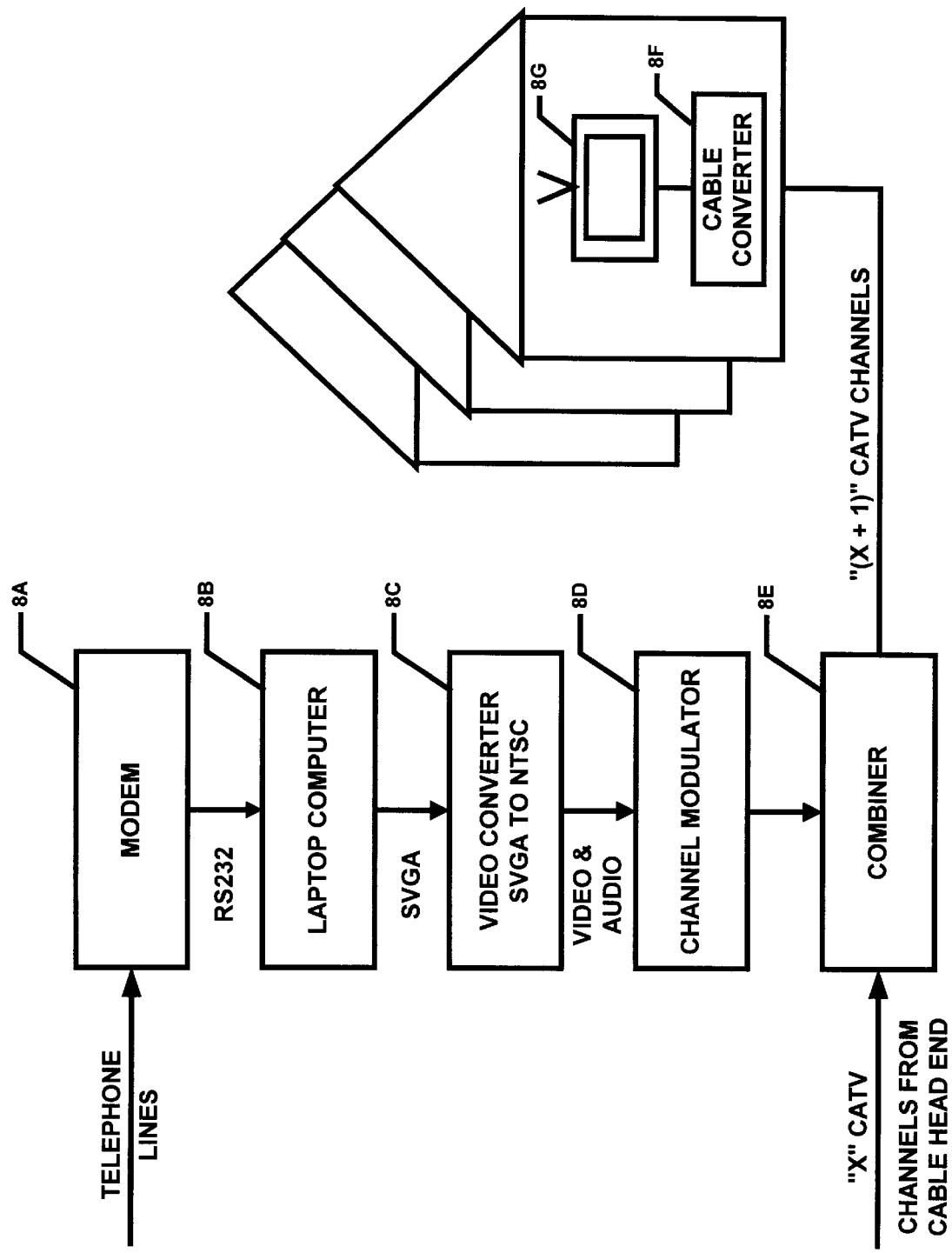
FIG. 8 is a block diagram of a system for presenting a TV schedule for cable television.

The present system may be employed with a TV schedule display for cable TV as indicated in FIG. 8. The purpose of this block diagram in this figure is to illustrate computer means for generating a graphical interface that is combined with cable television signals and converted, at a subscriber's home (response unit) wherein icons are presented on the subscriber's screen which allows an individual to select one of several simultaneously displayed choices. These choices may be from pay for view program schedules.

Telephone lines connected to a neighborhood field station, more proximate to the response unit than the repeater station, provides digital information that will be converted to the graphical interface. The input to the telephone lines comes from the data center 2 computer 2D (FIG. 2). This connection is indicated by "other computer" in block 2 of FIG. 2. A modem 8A translates the telephone data from the data center to an input port (RS-232) of a computer 8B which is programmed to generate an SVGA program schedule graphical interface. A conventional video converter 8C converts the video interface (SVGA) to a TV standard format (NTSC). The signal from converter 8C may include both video and audio portions which are input to a conventional channel modulator 8D. The output from the modulator is input to a first terminal of a conventional combiner 8E for transfer of the graphical interface to cable subscribers. A second input of the combiner receives cable television material from a cable headend. The cable input to the combiner could be pay for view programs listed on the provided program schedule. If the subscriber uses his remote control device to choose a program, it is communicated to the data center. After billing, the headend is authorized to enable a paid customer to view the program in a conventional manner.

Thus, the graphical interface generated by the computer 8B provides a graphical overlay with program schedule information on TV 8G that allows a subscriber at a response unit to select a cable provided program, intelligently using convention cable converters 8F.

The computer generated graphical interface may be used to provide different types of information to the subscriber at the response unit. This may include information containing various goods and services as well as cable television program scheduling.

Figure 9:
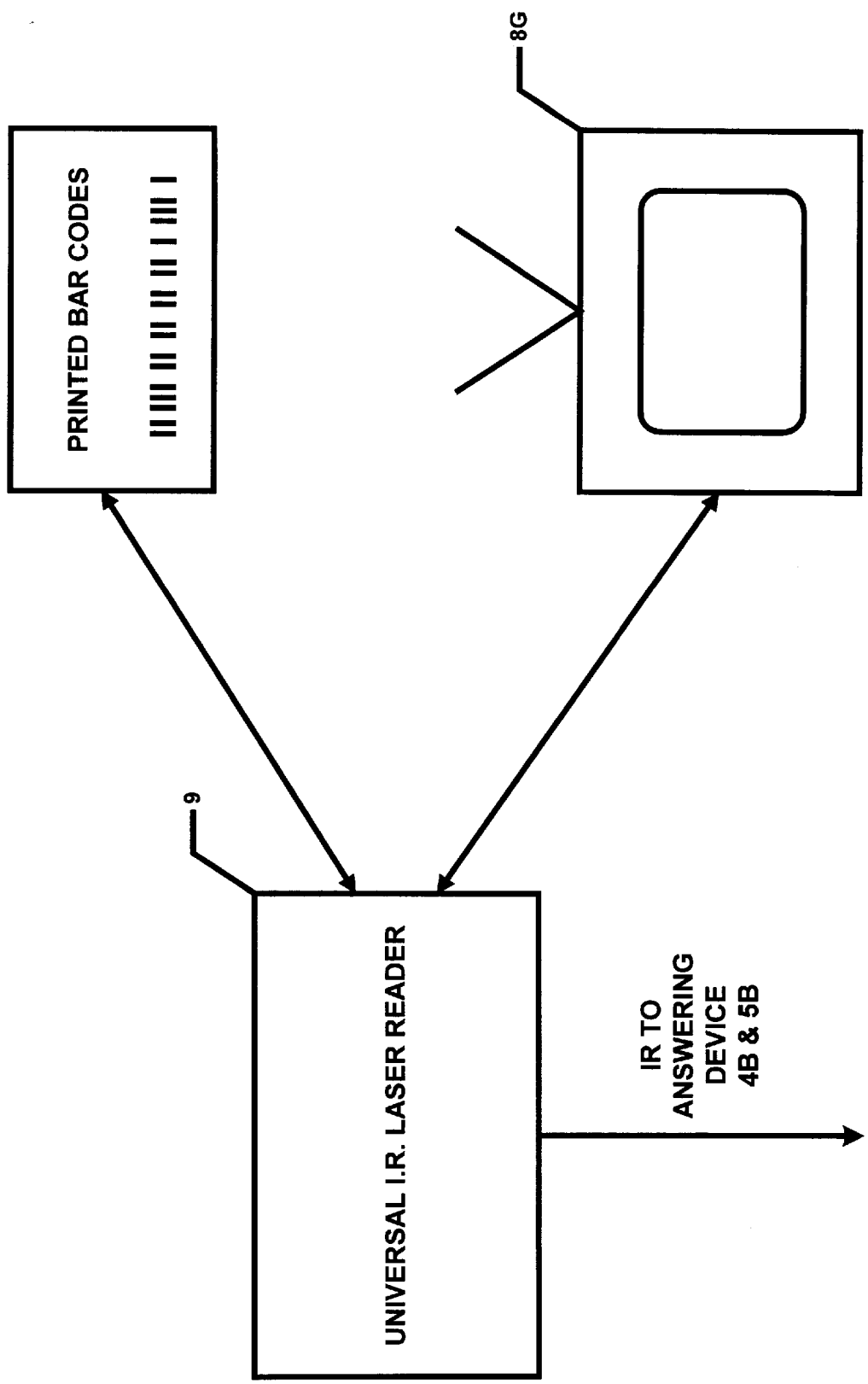
FIG. 9 is a block diagram of a remote-control device capable of reading printed bar codes or selecting segments on a TV screen.

FIG. 9 is an extension of the system shown in FIG. 8. It combines several aspects of the invention thus far discussed for the purpose of generating a graphical interface on the screen of a TV 8G in the form of icons. This allows a selection of one or more particular items from the display in a manner similar to that presented to computer users of Windows. Thus, with an appropriate remote control device such as an IR laser reader 9, it is possible to aim the reader at the screen and illuminate a particular icon in the same manner that a computer mouse selects icons on a Windows computer monitor screen. With a selection of a universal IR laser reader, it would be possible to use a single reader unit for selecting icons on the screen of TV 8G or to read printed bar codes for picking up the previously provided product or service codes on imprinted media, as previously discussed in connection with FIG. 5. The universal reader 9 would then return the selections from either printed media or the TV screen to the answering device such as discussed in connection with FIGS. 4–6.

Figure 10:
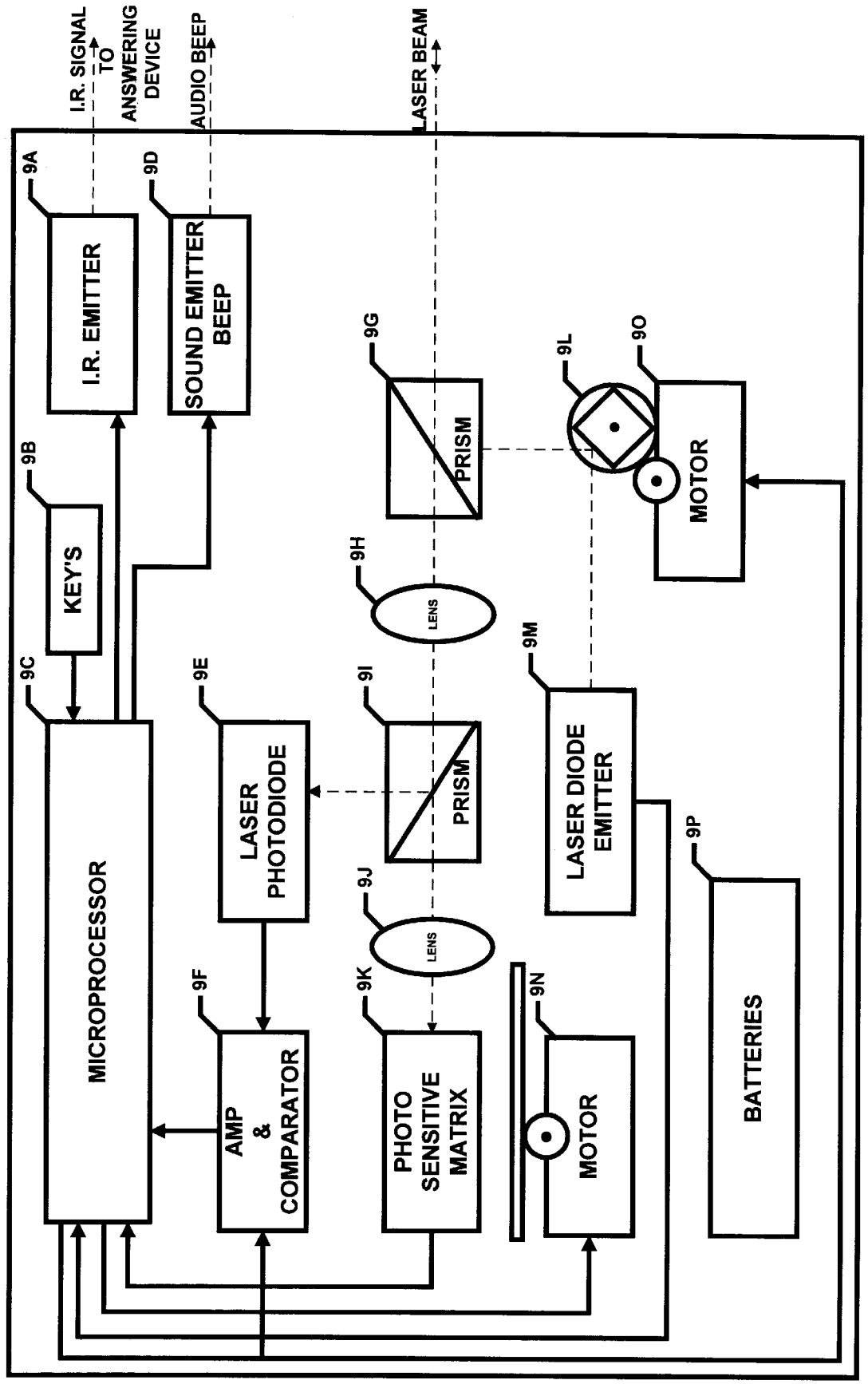
FIG. 10 is a block diagram showing the internal components of an infrared laser reading intended to be employed with the present invention.

FIG. 10 details the internal components of a universal infra red laser reader 9, briefly discussed in connection with FIG. 9. A keypad 9B provides user input to microprocessor 9C. For example, if the reader is to perform a bar code reading function, an appropriate key would be depressed. Microprocessor 9C energizes a laser diode emitter 9M after the key depression is made. Simultaneously, the microprocessor energizes a motor 9O which rotates a mirror 9L. The mirror is in line with the emitter light output from emitter 9M, thereby creating a moving laser beam. Motion between the motor and the mirror may be transmitted by means of appropriate gearing. The rotating beam is reflected from a cube prism 9G and is then directed outside the device. In the event that the beam is to read bar codes, the laser is reflected from the printed bar codes and returns through the device to prism 9G. From there, the reflected laser beam passes through lens 9H, and a second prism 9I reflects the return beam to a laser photodiode 9E. The photodiode is located at the focal point of the lens 9H. The output from the photodiode 9E is returned to the microprocessor 9C after amplification in circuit 9F. The microprocessor then energizes IR emitter 9A which generates an IR signal that is received by the answering device as discussed in connection with FIGS. 5 and 6. In lieu of an IR signal, if the system is set up for transferring particular code information by audio beep, as discussed in connection with FIG. 6, the microprocessor may drive a beep sound emitter 9D. The audio beep is then processed as discussed in connection with FIG. 6.

The universality of the IR laser reader shown in FIG. 10 is demonstrated by the fact that it may be used as "a mouse" to select icons of a graphical interface that is displayed on a TV as discussed in connection with FIG. 9. To achieve TV screen reading, the microprocessor 9C turns on the laser emitter 9M and locks the motor 9O to keep the mirror 9L stationary thereby reflecting light emitted from 9M to the center of prism 9G. The resulting laser beam then travels outside the device. The device is aimed by the user to impinge upon a television screen where it is reflected back into prism 9G for passage through lens 9H. After the lens, the reflected laser beam reflects in prism 9I and falls incident to a laser diode 9E. The output from photodiode 9E is compared at 9F with the original signal to the emitter 9M and a resulting error signal is received by the microprocessor 9C which produces a servo signal for motor 9N. The error signal is a comparison of the delay between laser beam transmission from the device and the time for its return. Assuming the device is properly aimed at a TV screen, the beam will be reflected from the screen and returned to the device in an interval corresponding to the distance between the screen and the device. The microprocessor stores a look up table for correlating the delay and corresponding distance. The detected distance causes the microprocessor to generate a corresponding servo signal for rotating the shaft of motor 9N, which in turn moves a lens 9J. The lens may be coupled to the motor through appropriate gearing such as schematically indicated in FIG. 10. The position of the lens is varied so that an aligned photo sensitive matrix 9K receives a clear image of the TV screen. The matrix 9k has its elements physically laid out in a manner corresponding to a matrix of icons displayed on the TV screen.

When the device of FIG. 10 is aimed toward the center of a TV screen, the elements of the matrix 9K are equally illuminated by the returning reflected laser beam. However, this changes when the device is aimed toward the various icons on the screen. The result will be darkened portions of the image impinging on the matrix. The darkened portions vary in accordance with degree and direction of the off axis aiming of the device toward the various icons. A look up table is stored in the microprocessor for correlating parameters of each darkened portion image with the x-y screen coordinates of a selected icon. The x-y coordinate data is then transmitting to an answering device via the microprocessor output and IR emitter 9A. The return of this information to the repeater station and data center establishes the item selected by the viewer for further processing.

It should be understood that the invention is not limited to the exact details of construction shown and described herein for obvious modifications will occur to persons skilled in the art.

I claim:

1. An interactive data system comprising:
    at least one response unit where end user's are located, the unit having normally received TV programs playing thereat, the programs presenting questions to the end user;
    audible beeps, corresponding to unique preselected codes, independent of program identification, being played by the TV program at the same time a corresponding question is posed;
    means located at the response unit for
        (a) indicating a response to a question;
        (b) picking up the audio beep;
        (c) generating a unique signal from both the picked up beep, indicative of the response to a particular question, and an identification of the response unit;
        (d) transmitting the generated signal to a local area repeater station; and
    means located at the repeater station for transmitting data, derived from the signal, to an audience response data center for processing of the data.

2. An interactive data system comprising:
    at least one response unit where end user's are located, the unit having normally received TV programs playing thereat, the programs presenting questions to the end user;
    audible beeps, corresponding to unique preselected codes, independent of program identification, being played by the TV program at the same time a corresponding question is posed;
    means located at the response unit for
        (a) indicating a response to a question;
        (b) picking up the audio beep;
        (c) generating a unique signal from both the picked up beep, indicative of the response to a particular question, and an identification of the response unit;
        (d) transmitting the generated signal to a local area repeater station; and
    means located at the repeater station for transmitting data, derived from the signal, to an audience response data center for processing of the data wherein printed media is available at the response unit presenting questions to the end user, the media also having unique preselected printed bar codes representing various fixed responses; the system further including;

a bar code reader for reading selected bar code responses and generating unique corresponding electrical signals therefrom;

answering means for transmitting the electrical signal, along with an identification of the response unit, to a local repeater station;

manual actuation means located at the response unit for gating transmission of the electrical signal through the answering means; and means located at the repeater station for transmitting data, derived from the signal, to an audience response data center for processing of the data.

3. The interactive data system set forth in claim 2 wherein the answering means further comprises:

means for picked up audio beeps;

a microprocessor having inputs for the bar code reader and the manual actuation means for creating a unique signal, representing a corresponding bar code or audio beeps responses to be transmitted to a repeater station; and transmitting means connected to the microprocessor for transmitting a coded response at several different frequency signatures during an interval of time.

4. The interactive data system set forth in claim 3 wherein the transmitting means operates a frequency synthesizer connected to the microprocessor, the transmitting means further comprising:

a voltage reference circuit driving a voltage controlled oscillator for producing a carrier frequency;

means for generating a count corresponding to the output frequency of the voltage controlled oscillator;

a frequency number derived from the microprocessor indicative of the carrier frequency;

means for comparing the frequency number with the generated count;

memory means for storing data for a plurality of pulse;

means for transmitting an address from the microprocessor to an input of the memory means for producing the data of the addressed pulse at an output of the memory means;

means for converting the pulse data to analog form;

means for modulating the carrier with the converted pulse, sequential modulations forming frequency signatures as function of time; and an antenna for transmitting to a repeater station.

5. A method or returning responses from at least one response unit of an interactive data communication system, the method comprising the steps;

establishing at least one response unit site which receives normal TV or radio programs from a party the programs including questions accompanied by an audible beep corresponding to a unique preobtained code from the question;

indicating a response to the question;

picking up the audio beep;

generating a unique signal from the picked up beep, indicative of a response to a particular question as well as an identification of the response unit;

transmitting the generated signal to a local area repeater station; and transmitting data, derived from the signal, to an audience response data center for processing of the data.

6. A method of data communication comprising the steps:

generating a unique signal by receiving an audible signal from an electronic device;

combining the received audible signal with a unique identifier of a response unit;

communicating the unique signal from the response unit to a local area repeater station;

verifying the unique signal at the local area repeater station; and communicating the generated signal from the repeater station to a data center for peocessing.

* * * * *